(12) United States Patent
Deutsch

(10) Patent No.: US 6,925,215 B2
(45) Date of Patent: Aug. 2, 2005

(54) OPTICAL CHANNEL MONITORING CHIP

(75) Inventor: Bernhard A. Deutsch, Hickory, NC (US)

(73) Assignee: Corning Incorporated, Corning, NY (US)

( * ) Notice: Subject to any disclaimer, the term of this patent is extended or adjusted under 35 U.S.C. 154(b) by 319 days.

(21) Appl. No.: 10/362,497

(22) PCT Filed: Aug. 23, 2001

(86) PCT No.: PCT/DE01/03221

§ 371 (c)(1),
(2), (4) Date: Feb. 21, 2003

(87) PCT Pub. No.: WO02/17515

PCT Pub. Date: Feb. 28, 2002

(65) Prior Publication Data

US 2003/0169957 A1 Sep. 11, 2003

(51) Int. Cl.[7] .............................. G02B 6/12; H04J 14/02
(52) U.S. Cl. .......................... 385/14; 385/37; 385/129; 385/24; 398/82; 398/87
(58) Field of Search .............................. 385/14, 37, 24, 385/129, 130; 398/82, 87, 79

(56) References Cited

U.S. PATENT DOCUMENTS

| 5,986,782 | A | * | 11/1999 | Alexander et al. | ............ | 398/26 |
|---|---|---|---|---|---|---|
| 6,574,386 | B1 | * | 6/2003 | Sufleta | ......................... | 385/16 |
| 2002/0044742 | A1 | * | 4/2002 | Yoneda | ....................... | 385/37 |
| 2002/0057875 | A1 | * | 5/2002 | Kaneko | ....................... | 385/37 |
| 2002/0141013 | A1 | * | 10/2002 | Patel et al. | ................. | 359/124 |
| 2002/0159678 | A1 | * | 10/2002 | Derventzis et al. | ........... | 385/16 |
| 2003/0048498 | A1 | * | 3/2003 | Pearson et al. | ............. | 359/110 |
| 2003/0095737 | A1 | * | 5/2003 | Welch et al. | ................. | 385/14 |
| 2003/0169957 | A1 | * | 9/2003 | Deutsch | .................... | 385/14 |
| 2004/0105610 | A1 | * | 6/2004 | Rahman | ..................... | 385/14 |

OTHER PUBLICATIONS

"Optoelectronic and Photonic Integrated Devices for Optical Modules in Fiber Optic Subscriber systems" Yoshida, et al IEE Conference NY, US Jun. 14, 1992 pp. 1784–1788.
"Integrated real time multi–channel wavelength monitoring circuit using phased–array waveguide grating" Zhong, et al OFC/IOOC Conference Feb. 21, 1999 pp. 30–32.
"Novel Micro–Mirror Fabrication Technique for Silica–Based PLC and its Application to 24–ch WDM Photo–Receiver with AWG" Terui, et al, Lasers and Electro–Optics Society Annual Meeting 1998, Orlando, FL, USA.

* cited by examiner

Primary Examiner—Brian M. Healy
(74) Attorney, Agent, or Firm—Walter M. Douglas

(57) ABSTRACT

The invention provides an optical channel monitor chip with an optical coupler for forming a first intermediate signal and a second intermediate signal, and with an AWG-DWDM demultiplexer which splits the second intermediate signal into the individual optical signal parts of the respective wavelength ranges.

17 Claims, 3 Drawing Sheets

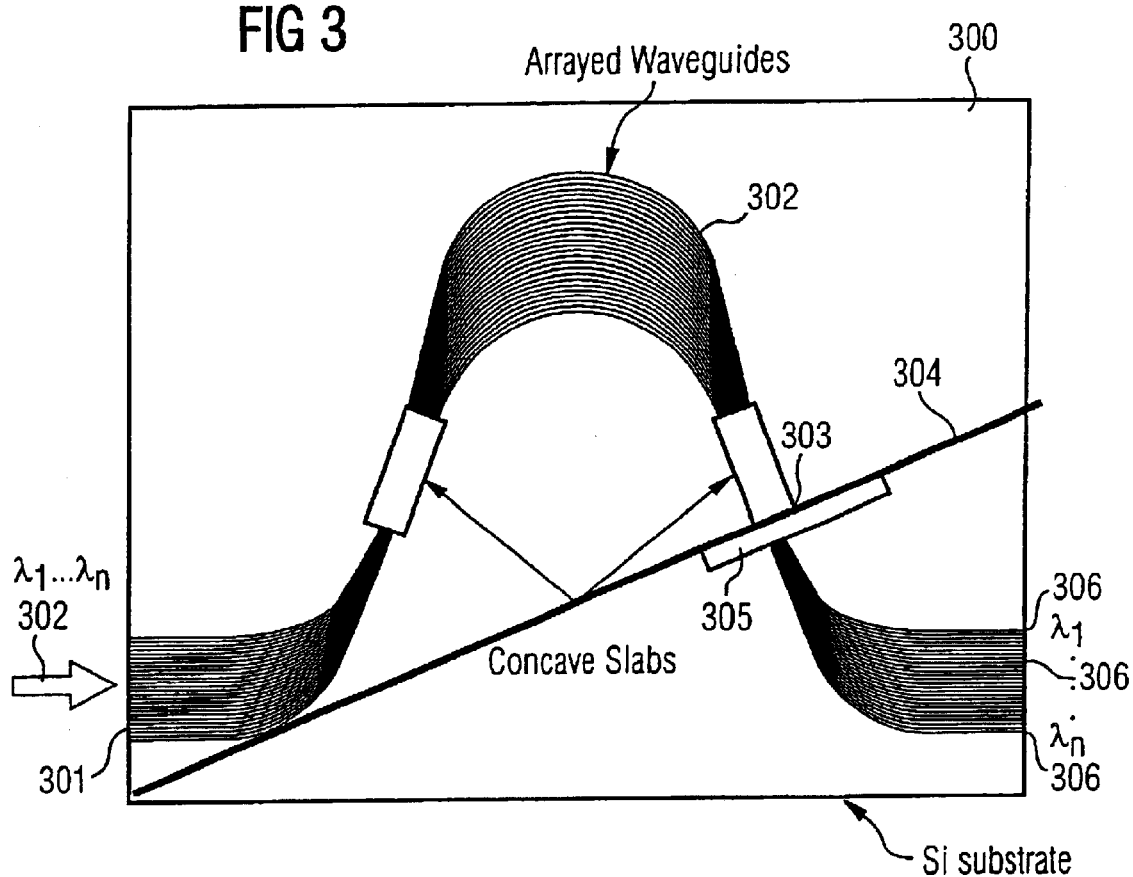
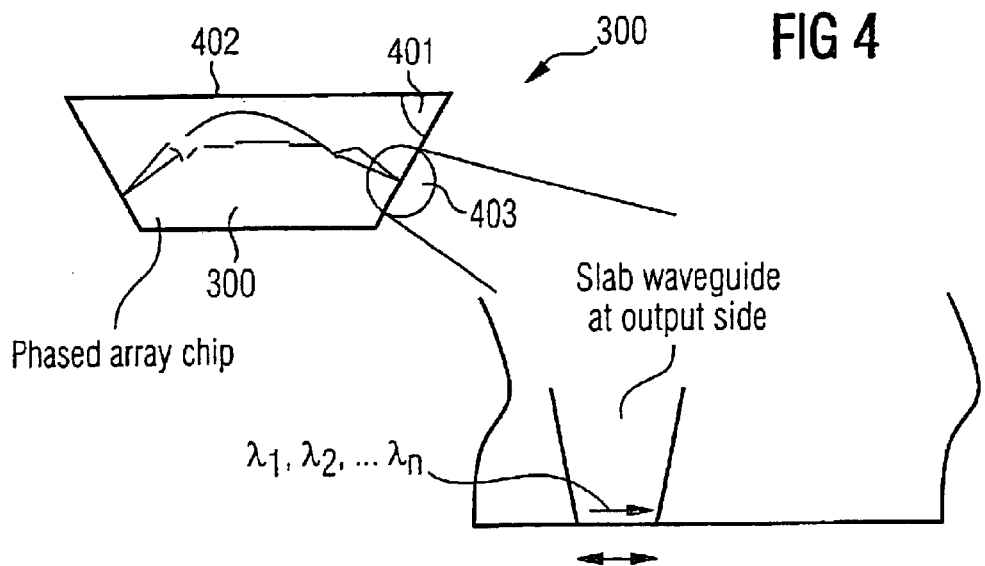

OPTICAL CHANNEL MONITORING CHIP

PRIORITY APPLICATIONS

This application is a national stage filing under 35 U.S.C. §371 of PCT Application No. PCT/DE01/03221, filed Aug. 23, 2001 and claims priority of such application and of German Application No. 100 41 499.0, filed Aug. 24, 2000, upon which the PCT application is based.

FIELD OF THE INVENTION

The invention is directed to an optical channel monitor chip for monitoring an input signal with a plurality of signals of different wavelength ranges.

BACKGROUND OF THE INVENTION

In an optical transmission system, in particular in a transmission system based on the technique of wavelength multiplexing, it is increasingly required to monitor the following important optical transmission-related parameters:

- the medium wavelength,
- the relative channel length,
- the optical transmission level, and
- the optical signal noise ratio.

It is known to measure the optical transmission-related parameters when drafting and installing a transmission line. In this context, in most cases, an optical spectral analyser with an accordingly adapted interpretation software is used to determine the above mentioned transmission-related parameters. However, the measurements are carried out when installing the line represent only momentary measuring. Changes in the individual network components, for example, those caused by their ageing or by replacing the original network components with new network components, are not registered by this momentary measuring.

It is further known to monitor the transmission system by using a test signal, said test signal having a wavelength beyond the wavelength range that is usually used for the transmission of the electrical and, respectively, optical signals.

It is further known to register one part of the above mentioned parameters continuously by means of an optical channel monitor module and to forward it to a central administration system. A value that is difficult to measure in this context is the so-called medium wavelength or, respectively, the relative channel position in a wavelength multiplexer system. Under medium wavelength is to be understood in this context the wavelength which indicates the centre of a wavelength range (wavelength interval) covered by a channel.

For its (the medium wavelength) measuring, a broadband part of the light representing the respective signal is usually first decoupled from the transmission channel. The broadband part is then split into its spectral parts via a wavelength-dependent element, for example, via an optical filter, and the spectral elements are then analysed.

The methods used to accomplish this are known, and are the use of a Fabry-Perot interferometer, a so-called Bragg grating or wavelength dependent attenuators. U.S. Pat. No. 5,986,782 describes a device for monitoring signal-to-noise in WDM optical communication systems. J. Yoshuda et al., Optoelectronic and Photonic Integrated Devices for Optical Modules in Fiber Optic Subscriber Systems", presented at "Discovering A New World Of Communications". Chicago, June 14–18, 1992; Vol. 3, *Proceedings Of The International Conference On Communications*, (New York, IEEE 1992), pages 1784–1788, describes various devices that can be used in optical communications. The disadvantage of the known methods is especially that only the power of the individual signal parts with the corresponding wavelengths can be determined.

The problem is solved by the present invention and is based on the use of an optical channel monitor chip with which it is easier to monitor the individual medium wavelengths of the signal parts. The problem is solved by the optical channel monitor chip with the features as described herein in the specification and the claims.

SUMMARY OF THE INVENTION

The invention is directed to an optical channel monitor chip for monitoring an input signal with a plurality of signals of different wavelength ranges is provided with an input connector for receiving the input signal. Further, the invention is directed to an optical coupler that is connected to the input connector, and with the optical coupler a first intermediate signal and a second intermediate signal are decoupled from the input signal, wherein both the first and the second intermediate signal respectively contain all signal parts of the input signal, yet with an amplitude distribution that can be pre-set between the two intermediate signals.

According to an embodiment of the invention it is, for example, provided to use an optical 1:9 coupler or even an up to 1:99 coupler. That is, an optical coupler in which the first intermediate signal respectively has a part of the total amplitude, and the second intermediate signal has 9 or, respectively, 99 parts of the amplitude of the input signal.

A first output connector is connected to one exit of the optical coupler, and the first intermediate signal can be calipered (measured) at the first output connector.

An entry of a DWDM demultiplexer is connected to a second exit of the optical coupler, said DWDM demultiplexer being based on the principle of the planar lightwave guides (Arrayed Waveguide Grating-DWDM demultiplexer, AWG-DWDM demultiplexer). By means of the DWDM demultiplexer the second intermediate signal which has all the signal parts, i.e. all frequency parts, of the input signal, yet only with reduced amplitude, is split into individual independent signals, which respectively have the signal parts of separated transmission channels, i.e. different wavelength ranges. Thus, in an illustrative way, the frequencies are spectrally split in the second intermediate signal by means of the DWDM demultiplexer, which signal parts can be provided at a second output connector, said second output connector being connected to an exit of the DWDM demultiplexer.

With the invention it becomes possible, for the first time with an AWG chip, to determine the first intermediate signal and thus the input signal on-line with the respective individual signals in the different wavelength ranges and to compare them with one another. Further, it particularly becomes possible to determine the medium wavelengths of the signal parts by using a calibrated optical channel monitor chip.

Additional further embodiments of the invention result from an understanding of the dependent claims, the specification and the appended drawings.

BRIEF DESCRIPTION OF THE DRAWINGS

FIG. 3 is a schematic sketch of the optical channel monitor chip according to an embodiment of the invention.

FIG. 4 illustrates a cross-section of the optical channel monitor chip according to an embodiment of the invention.

DETAILED DESCRIPTION OF THE INVENTION

According to the invention, it is provided to integrate an optical detector unit on the optical channel monitor chip, the optical detector unit being provided for example with a plurality of optical detector elements, preferably high resolution lines scanners or photodiodes, which are positioned preferably at a distance of typically at least 2.5 $\mu$m from one another, or at a least minimum of 0.1 $\mu$m from one another. By providing an optical detector unit it becomes possible to carry out directly on an optical channel monitor chip a conversion of optical signals (light signals) into electrical signals. In this way in particular an on-chip signal processing of electrical signals becomes possible. Photodiodes allow for a very inexpensive realisation of an optical channel monitor chip embodied as described above.

An analog/digital converter 116 (A/D, FIG. 1) is connected to one or more exits of the optical detector unit, that, is, for example, formed by means of a plurality of optical detector elements which thus form a detector array as illustratively described herein and in the Figures. The analog/digital converter is provided with a number of entries that preferably correspond to the number of exits of the optical detector unit, and thus to the number of optical detector elements, if each optical detector element is provided with an exit. The analog/digital converter can be coupled to any further interpretation logic and/or signal processing logic for producing a logical output signal, which issues an output signal according to a pre-set processing function.

Figure 1:
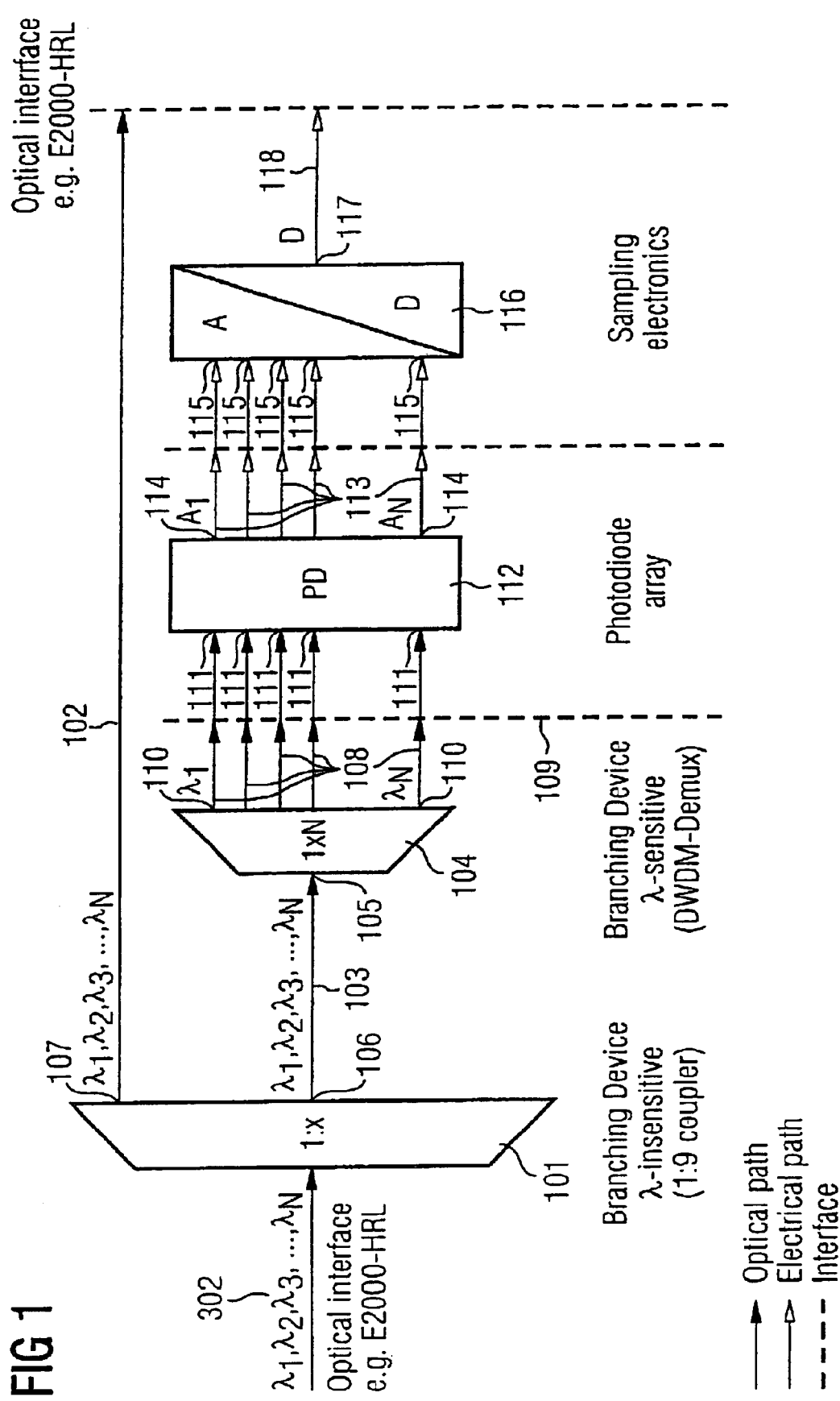
FIG. 1 is a schematic substitute circuit diagram of the individual components of the optical channel monitor chip according to an embodiment of the invention.

The DWDM demultiplexer, see FIG. 1, is chamfered on the exit side whereby the arranging of the individual optical detector elements at the DWDM demultiplexer for receiving the individual output signals provided by the DWDM demultiplexer becomes reflection-free or reflection-reduced. According to an embodiment of the invention the chamfering on the exit-side is made by grinding off or abrading the respective DWDM demultiplexer chip. The inclination of the chamfering can be in a range of 0°<x<10°, preferably in the range of the so-called Brewster-angle, that is, in a range of 7°<x<8° with reference to the surface of the optical channel monitor chip, along which the wave propagation occurs. In this context it has to be noted that the chamfering can occur horizontally or vertically with respect to the surface of the optical channel monitor chip.

An example of an embodiment of the invention is represented in the appended Figures and is explained in more detail below.

FIG. 1 is a schematic substitute circuit diagram of the individual components of the optical channel monitor chip according to an embodiment of the invention. Among other elements, FIG. 1 illustrates a $\lambda$-insensitive branching device 101 (first branching device illustrated as a 1:9 coupler), a $\lambda$-sensitive branching device 104 (second branching device illustrated as a DWDM-Demultiplexer (Demux)), a photodiode array 112 (PD, FIG. 1) and sampling electronics 116. An optical path, exists between the $\lambda$-insensitive branching device 101, the $\lambda$-sensitive branching device 104 and the photodiode array 112. An electrical path exists between the photodiode array 112 and the sampling electronics 116. The output(s) of photodiode array 112 are sent as electrical signal 115 to the sampling electronics 116. The output of the sampling electronics 116 is an electrical signal 118. The digital signal 118 from, for example, A/D element 116, can be coupled to any further interpretation logic and/or signal processing logic for producing a logical output signal, which issues an output signal according to a preset processing function.

Figure 2:
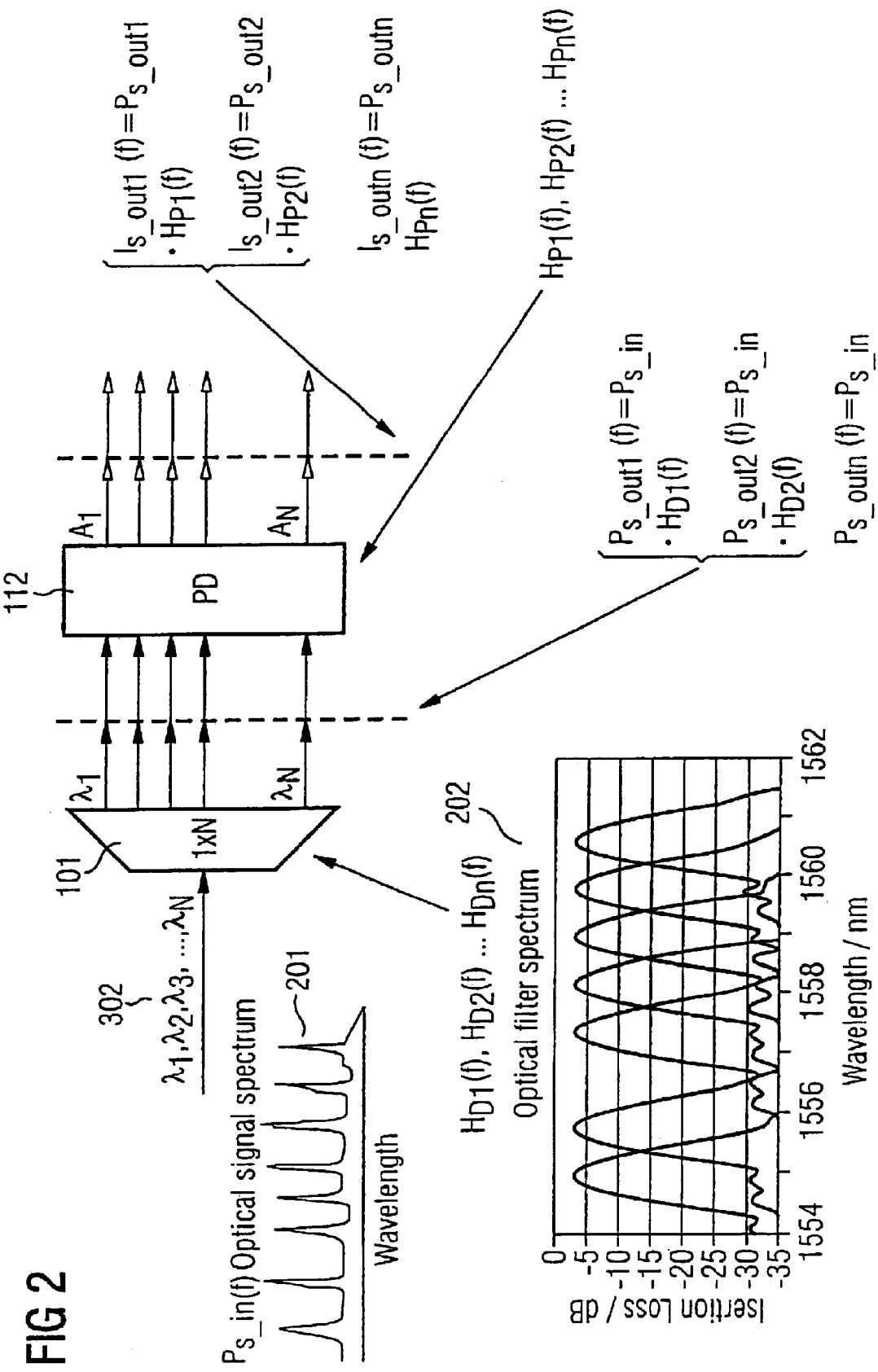
FIG. 2 illustrates a section of the AWG-DWDM demultiplexer and of the optical detector unit, by means of which a calibrating of the optical channel monitor chip according to an embodiment of the invention is explained.

FIG. 2 illustrates a section of the AWG-DWDM demultiplexer 101 and of the optical detector unit 112, by means of which a calibrating of the optical channel monitor chip according to an embodiment of the invention is explained.

FIG. 3 is a schematic sketch of the optical channel monitor chip according to an embodiment of the invention.

FIG. 4 illustrates a cross-section of the optical channel monitor chip according to an embodiment of the invention.

FIG. 3 shows an optical channel monitor chip 300 according to an embodiment of the invention. The optical channel monitor chip 300 is made of a substrate of silicon or quartz glass (silicon dioxide).

Via an input connector 301 (FIG. 3), an input signal 302 is guided to the optical channel monitor chip 300, said input signal 302 having a plurality of signal parts with respectively different wavelength ranges and thus with different medium wavelengths $\lambda$ $\lambda_1$, . . . , $\lambda_n$.

The input signal 302 is guided to an optical coupler 101 (See FIG. 1), by which the input signal 302 is split in the ratio 1:99 into a first intermediate signal 102 (with a part 1 of a total of 100 parts of the amplitudes of the respective signals of the input signal 302) and a second intermediate signal 103 (with 99 parts of a total of 100 parts of the amplitudes of the signal parts of the input signal 302). The first intermediate signal 102 is directly guided to an input connector (not shown) of the optical channel monitor chip 300 and can be calipered there.

The second intermediate signal 103 is guided to a DWDM demultiplexer 302, 104 based on the principle of the planar lightwave guides via its entry 105 which is coupled to a second exit 106. The second intermediate signal 103 is split into the individual signal parts by the AWG-DWDM demultiplexer 302, 104, corresponding to the different wavelength ranges, i.e. the different channels which are contained in the second intermediate signal 103.

For n signal parts in the input signal 302 with different wavelength ranges there is thus a splitting by the AWG-DWDM demultiplexer 104 into n optical partial signals 108, which respectively show the following medium wavelengths $\lambda_1, \ldots, \lambda_n$. The individual n exits 110 of the AWG-DWDM demultiplexer 104 are connected to entries 111 of a photodiode ("PD") array 112 via an optical interface 109, wherein respectively one exit 110 of the AWG-DWDM demultiplexer 104 is connected to an entry 111 of the photodiode array 112. By means of the photodiodes provided in the photodiode array 112, the individual optical signal parts in the respective wavelength ranges are converted into electrical partial signals 113, which are respectively provided at an exit 114 of the photodiode array 112. The exits 114 of the photodiode array are connected to entries 115 of an analog/digital converter 116, so that respectively one electrical partial signal 113 is guided to an entry 115 of the analog/digital converter 116. Via an exit 117 of the analog-to-digital converter 116 an output signal 118 is provided as output signal of the optical channel monitor chip 300.

As shown in FIG. 3, the analog/digital converter 116 can also be dispensed with, so that at the respective exits 303 of the AWG-DWDM demultiplexer 302 via a chamfered edge 304 the photodiode array 305 is coupled, via which the individual partial signals are distributed to output connectors 306 positioned at a distance to one another, preferably 2,5 μm, and can be calipered.

In the following the calibrating of the optical channel monitor chip 300 is explained in more detail by means of FIG. 2.

The input signal 302 shows the optical signal spectrum 201 shown in FIG. 2 as a function $P_{s\_in}(f)$ dependent on the wavelength of the respective signal parts. The optical coupler 101 shows a plurality of frequency-dependent transmission functions $H_{D1}(f), H_{D2}(f), \ldots, H_{Di}(f), \ldots, H_{Dn}(f)$ as shown in FIG. 2 as total transmission function 202. Thus results the respective optical partial signal $P_{s\_outi}(f)$ 108 in the respective wavelength range with the medium wavelength $\lambda_i$ at the optical interface 109 according to the following rules:

$$P_{s\_out1}(f) = P_{s\_in} \cdot H_{D1}(f), \quad (1)$$

$$P_{s\_out2}(f) = P_{s\_in} \cdot H_{D2}(f), \quad (2)$$

$$P_{s\_outi}(f) = P_{s\_in} \cdot H_{Di}(f), \quad (3)$$

$$P_{s\_outn}(f) = P_{s\_in} \cdot H_{Dn}(f). \quad (4)$$

The respective optical partial signals 108 are guided, as shown above, to the photodiode array 112, which again has a frequency-dependent total transmission function specific for the photodiode array 112, with individual transmission function $H_{P1}(f), H_{P2}(f), \ldots, H_{Pi}(f), \ldots, H_{Pn}(f)$.

Thus results at the exits 114 of the photodiode array 112 for each electrical partial signal the following current signal $I_{s\_outi}(f)$ 113:

$$I_{s\_out1}(f) = P_{s\_out1} \cdot H_{P1}(f), \quad (5)$$

$$I_{s\_out2}(f) = P_{s\_out2} \cdot H_{P2}(f), \quad (6)$$

$$I_{s\_outi}(f) = P_{s\_outi} \cdot H_{Pi}(f), \quad (7)$$

$$I_{s\_outn}(f) = P_{s\_outn} \cdot H_{Pn}(f). \quad (8)$$

The photodiode array 112 is provided at the chamfered edge 304 of the optical channel monitor chip 300.

As shown in FIG. 4, the chamfered edge 304 is provided on the output side and alternatively additionally on the input side with an angle 401, with respect to the surface 402 of the optical channel monitor chip 300 in a range between $0° < x < 10°$ preferably in a range of the Brewster angle of $7° < x < 8°$ for a quartz-glass/air transition.

As is shown via the section 403 in FIG. 4, the individual electrical partial signals 113 can be calipered at the exits 114 of the photodiode array, wherein the exits 114 are arranged in a local resolution of approximately 2,5 μm, which for 32 channels with 100 GHz maximum operation frequency results in a provided bandwidth of in total 32*100 GHz.

In the case of a width of the photodiode array 112, along which the optical partial signals 108 can be calipered on the input side, and respectively, the electrical partial signals 115 on the output side, with 640 μm and with a required wavelength exactness of 0.05 nm, the exits 114 of the photodiode array 112 can be arranged for example at a distance of 2.5 μm to one another.

As can be seen from rules (5) to (8), with calibrated optical channel monitor chip 300 the actual medium wavelength $\lambda_i$ can be obtained by simple "back-calculating" from rules (5) to (8) via rules (1) to (4), since the information concerning the respective medium wavelength $\lambda_i$ is contained in the respective transmission function $H_{Di}(f)$.

In addition, it is possible to monitor the optical signal-noise ratio. According to the optical channel monitor chip 300 shown above, a signal bandwidth of more than 32 nm up to maximally 60 nm can be achieved with a spectral resolution that is below 0,03 nm. The wavelength exactness is ±0.05 nm, and the attenuation exactness ±0.5 dB, maximally up to 0.1 dB.

The exactness of the determined optical signal noise ratio values is ±1.0 dB in a range of the optical signal noise ratio of 30 dB.

The optical channel monitor chip 300 can be operated in a temperature range of approximately −5° C. to 70° C., preferably in a temperature range of 0° C. to 65° C.

What is claimed is:

1. Optical channel monitor chip for monitoring an input signal with a plurality of signals of different wavelength ranges, with a chip input connector for receiving the input signal, with an optical coupler which forms out of the input signal a first intermediate signal and a second intermediate signal, wherein the first intermediate signal and the second intermediate signal respectively have the signals of all wavelength ranges of the signals of the input signal, with a first chip output connector where the first intermediate signal can be calipered, with a planar DWDM demultiplexer comprising a slab waveguide on the input side, a slab waveguide on the output side and an optical waveguide field connecting both these slab waveguides and a demultiplexer input connector on the input side waveguide by which the second intermediate signal is guided to the DWDM demultiplexer, and wherein by means of the DWDM demultiplexer the second intermediate signal can be split into the signals of the respective wavelength ranges, and which comprises DWDM demultiplexer output connectors on the output side slab waveguide which the signals of the respective wavelengths are guided to, and with at least a second chip output connector connected to a corresponding one of the DWDM demultiplexer output connectors (303), with an optical detector unit provided between the DWDM demultiplexer and the at least second chip output connector, wherein the optical coupler is integrated on the optical chip and the optical detector unit is directly connected to the DWDM demultiplexer output connectors at a chamfered edge of the optical channel monitor chip.

2. The optical channel monitor chip according to claim 1, wherein the optical detector unit has a plurality of optical detector elements.

3. The optical channel monitor chip according to claim 2, wherein the optical detector elements are respectively positioned at a distance of at least 0,1 μm from each other.

4. The optical channel monitor chip according to claim 2, wherein at least a part of the optical detector elements are high-resolution line scanner elements.

5. The optical channel monitor chip according to any of claim 2, wherein at least one part of the optical detector elements is photodiodes.

6. The optical channel monitor chip according to any of claim 1, wherein between the DWDM demultiplexer and the second chip output connector, an analog/digital converter is provided.

7. The optical channel monitor chip according to any of claim 1, wherein the DWDM demultiplexer has been ground off or abraded on the output side.

8. The optical channel monitor chip according to any of claim 1, wherein the angle of inclination x of the chamfered edge is 0°<x<10° horizontally or vertically with respect to the surface of the direction of propagation of the lightwave signals along the DWDM demultiplexer.

9. The optical channel monitor chip according to claim 8, wherein the angle of inclination is 7°<x<8°.

10. An optical channel monitor chip for monitoring an optical signal, said optical monitoring chip comprising:
- a first branching or coupling device for receiving an optical signal from an optical signal source and separating the optical signal into two signals of different amplitudes,
- a second branching or demultiplexing device for separating one of said two optical signals into its separate wavelength components,
- an optical detector device for receiving the signals from the branching or demultiplexing device and converting the received optical signals into electrical signals,
- optionally, sampling electronics having a plurality of receptors to receive the electrical from said optical detector device, and
- optionally, a device or element for receiving signals from said optional sampling electronic to thereby further process said signal according to an interpretation logic or a signal sampling logic to produce a logical output signal as an output;
- wherein said first branching or coupling device, said second branching or demultiplexing device and said optical detector device are integrated on the optical monitoring chip.

11. The optical monitoring chip according to claim 10, wherein the optical monitoring chip has a chamfered edge and the optical detector is directly connected to the second branching or demultiplexer at said chamfered edge.

12. The optical monitoring chip according to claim 11, wherein the angle of inclination x of the chamfered edge is 0°<x<10° horizontally or vertically with respect to the surface of the direction of propagation of the lightwave signals along the second branching or demultiplexing device.

13. The optical monitoring chip according to claim 12, wherein the angle of inclination x of the chamfered edge is 7°<x<8°.

14. The device according to claim 11, wherein the optional sampling electronic are present and the signal from said electronic as further processed according to an interpretation logic or a signal sampling logic to produce a logical output signal as an output.

15. The device according to claim 11, wherein the sampling electronic are not present and the signals from the optical detector are distributed as individual output signals of the optical monitoring chip.

16. The optical chip according to claim 10, wherein the optical detector selected from the group consisting of photodiodes and high resolution line scanners.

17. The optical monitoring chip according to claim 10, wherein the optical detector is a photodiode array.

* * * * *